Figure 4:
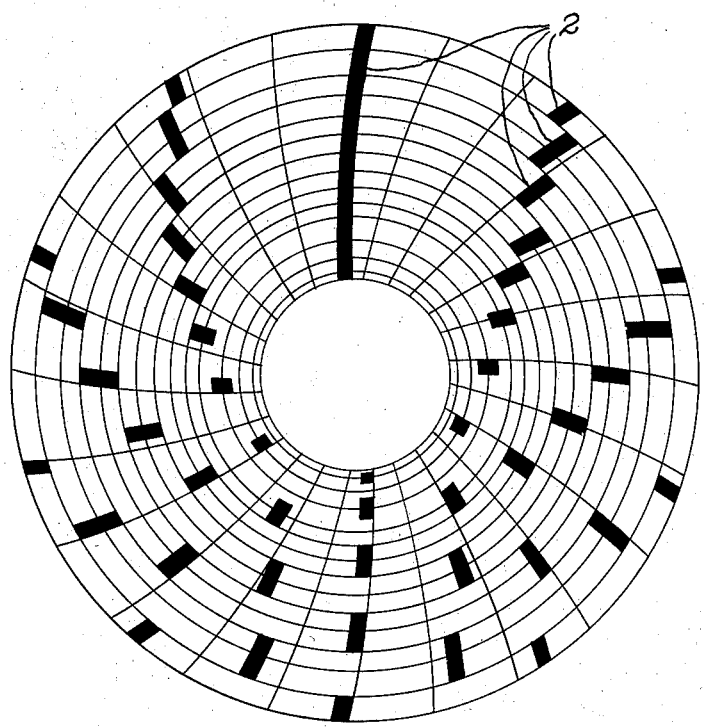

July 26, 1949.    G. C. FAIRBAIRN    2,477,513
AUTOMATIC SAMPLING DEVICE
Filed Sept. 13, 1947    2 Sheets-Sheet 1
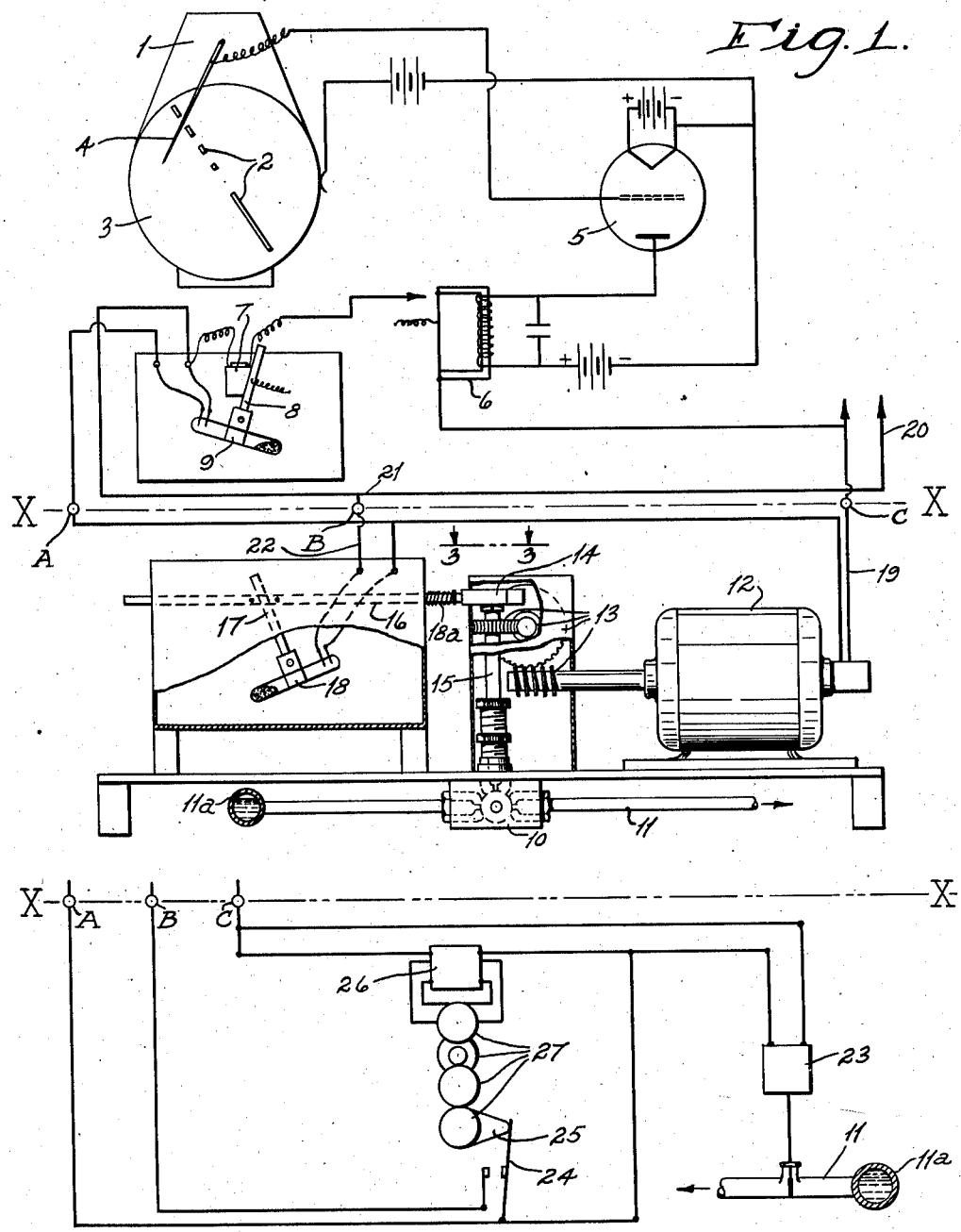
Fig. 1.
Fig. 2.
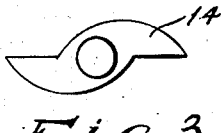
Fig. 3.
INVENTOR.
GEORGE C. FAIRBAIRN
BY Daniel Stryke
J. H. Grahame
ATTORNEYS July 26, 1949.    G. C. FAIRBAIRN    2,477,513
AUTOMATIC SAMPLING DEVICE Filed Sept. 13, 1947    2 Sheets-Sheet 2

INVENTOR.
GEORGE C. FAIRBAIRN
BY Daniel Stryker
J. H. Grahame
ATTORNEYS

Patented July 26, 1949

2,477,513

UNITED STATES PATENT OFFICE 2,477,513

AUTOMATIC SAMPLING DEVICE

George C. Fairbairn, Port Arthur, Tex., assignor to The Texas Company, New York, N. Y., a corporation of Delaware Application September 13, 1947, Serial No. 773,879

5 Claims. (Cl. 73—422)

The invention concerns an automatic sampling device for use in obtaining samples of fluids moving through a pipe line.

It is an object of the invention to provide means for obtaining samples which are representative of gases or liquids passing through a pipe line during a given time interval.

It is a further object of the invention to provide an automatic sampling device adapted to take samples intermittently at time intervals corresponding to the rate of flow through the pipe line, each of the samples being of predetermined volume.

It is customary to measure the rate of flow through a pipe line by means of flow meters of either the displacement type or the differential type. The device of the invention includes a flow meter of the differential type. In a copending application, Serial No. 773,878, filed concurrently herewith, now Patent No. 2,461,045, I have disclosed and claimed an automatic sampling device which includes a displacement type meter.

The device of the invention includes a sample draw-off line connected to the pipe line, a shutoff valve in the sample draw-off line, and valve operating means adapted to open and close the shutoff valve. A differential type flow meter installed in the pipe line is responsive to fluctuations in rate of flow through the pipe line. A primary timing mechanism actuated by the flow meter is adapted to complete an electrical circuit intermittently at time intervals corresponding to the rate of flow through the pipe line. A secondary timing mechanism actuated by a constant speed electric motor is adapted to complete another electrical circuit and to break the last mentioned circuit after a predetermined period of time has elapsed during which period the sample is withdrawn. The valve operating means and the secondary timing mechanism are actuated by first one and then the other of the electrical circuits.

In the device of the invention the primary timing mechanism, which is actuated by the differential type flow meter may comprise a mercury switch mounted on a lever, a solenoid adapted to act upon the lever to tilt the mercury switch, a vacuum tube relay adapted to control the operation of the solenoid and contact points mounted on the rotating disc and the pen of the meter adapted to complete the grid circuit of the vacuum tube relay. Concentric rows of contact points may be mounted on the rotating disc, the number of contact points in the several rows increasing progressively from the center of the disc outwardly, the arrangement being such that the pen engages the contact points on the rotating disc at more frequent intervals as it swings outwardly from the center of the disc in response to increases in flow rate.

The valve operating means which opens and closes the shutoff valve may comprise either a solenoid or a constant speed electric motor equipped with speed reducing gears.

The secondary timing mechanism, which is actuated by a constant speed electric motor, may comprise a switch adapted to be opened and closed by an eccentric driven by the constant speed motor through speed reducing gears. When the valve operating means comprises a constant speed electric motor and speed reducing gears the secondary timing mechanism may be actuated by the valve operating means, the eccentric which constitutes a part of the timing mechanism being mounted directly on the valve stem and actuating a reciprocating rod which in turn acts upon a lever on which a mercury switch is mounted, to tilt the mercury switch.

The invention will be better understood from the following description and the accompanying drawing, in which:

Fig. 1 is a diagrammatic view in elevation of one form of the invention in which the valve operating means comprises a constant speed electric motor and speed reducing gears, and in which the secondary timing mechanism is actuated by the valve operating means.

Fig. 2 is a diagrammatic view in elevation of a modified form of the invention in which the valve operating means comprises a solenoid and the secondary timing mechanism comprises a switch adapted to be opened and closed by an eccentric driven by a constant speed motor through speed reducing gears. The apparatus shown in Fig. 2 may be substituted for the portion of the apparatus shown below the dotted line X—X of Fig. 1, the points A, B and C being common to both views.

Fig. 3 is an enlarged plan view taken on the line 3—3 of Fig. 1 showing in detail the eccentric which constitutes a portion of the secondary timing mechanism.

Fig. 4 indicates by use of a conventional meter chart the relative positions of the contact points on the rotating disc, the rotating disc and the pen of the meter being adapted to complete the grid circuit of the vacuum tube relay as shown diagrammatically in Fig. 1.

Referring to Figs. 1 and 4 of the drawing, a differential type meter 1 is installed in a pipe line and is responsive to fluctuations in rate of flow through the pipe line. Contact points 2 mounted on the rotating disc 3 and the pen 4 of the meter are adapted to complete the grid circuit of a conventional vacuum tube relay comprising a triode 5 and a plate relay 6. As shown in Fig. 4, concentric rows of contact points 2 may be mounted on the rotating disc 3, the number of contact points 2 in the several rows increasing progressively from the center of the disc 3 outwardly, the arrangement being such that the pen 4 engages the contact points 2 on the rotating disc 3 at more frequent intervals as it swings outwardly from the center of the disc 3 in response to increases in flow rate so that the samples will be taken more frequently as the flow rate increases.

The vacuum tube relay 6 controls the operation of a solenoid 7 which acts upon a lever 8 to tilt a mercury switch 9, the arrangement being such that an electrical circuit is completed through the mercury switch 9 each time the pen 4 of the meter engages one of the contact points 2 on the rotating disc 3. The foregoing arrangement is referred to as a primary timing mechanism.

A ball type shutoff valve 10 is installed in a sample draw-off line 11 leading from the pipe line 11a to be sampled. The shut-off valve 10 is operated by a constant speed electric motor 12 through speed reducing gears 13. An eccentric 14 mounted on the stem 15 of the shutoff valve 10 actuates a reciprocating rod 16 which in turn acts upon a lever 17 on which a single through mercury switch 18 is mounted, to tilt the mercury switch 18. The rod 16 is normally urged toward the eccentric by a coil spring 18a. This arrangement is referred to as a secondary timing mechanism and is equivalent to the secondary timing mechanism shown in Fig. 2 which will be described hereinafter.

Lead wires are provided which connect the constant speed motor 12 to a source of electricity. One of the lead wires 19 is connected directly to the motor 12, the other wire 20 being connected to the motor 12 through two separate circuits 21 and 22. One of the circuits 21 is adapted to be completed by the mercury switch 9 and the other circuit 22 is adapted to be completed by the mercury switch 18.

As shown in the drawing, both of the mercury switches 9 and 18 are open and no current flows to the motor 12. As soon as the pen 4 engages one of the contact points 2 on the rotating disc 3 the plate relay 6 will close and the solenoid 7 will be energized to complete the electrical circuit 21 through the mercury switch 9. The motor 12 will then be started and while the valve 10 is opening the eccentric 14 will turn, the reciprocating rod 16 moving to the right. The other electrical circuit 22 will be completed when the mercury switch 18 tilts downwardly to the right. The motor 12 will continue to run for a predetermined period of time, until the last-mentioned electrical circuit is broken by the action of the eccentric 14, the reciprocating rod 16 being moved to the left and acting upon the lever 17 to tilt the mercury switch 18 to inoperative position again as shown in the drawing. As shown in the drawing, the shutoff valve 10 is in closed position. It is opened and closed during each operation to permit a sample to be withdrawn through the sampling line 11. It is to be understood that the pen 4 remains in engagement with one of the contacts 2 until after the switch 9 has been tilted to the right.

It will be seen from the foregoing that as soon as the pen 4 engages one of the contacts 2, a circuit will be completed through the motor 12 which will start opening the valve 10 and also tilting the switch 18 downwardly to the right. As soon as the switch 18 closes, the circuit will be maintained through the motor 12 even though the pen 4 subsequently becomes disengaged from its contact 2. The motor 12 will thus continue to run, permitting a sample to be drawn through the draw-off pipe 11 until the cam 14 and rod 16 have tilted the switch 18 to its open position. The secondary timing mechanism, therefore, serves to time the period when the valve 10 is open and thus govern the amount of fluid withdrawn through the sample line regardless of the fact that the pen 4 may not remain in engagement with one of the contacts 2 for a sufficiently long period.

Referring to the modification shown in Fig. 2 of the drawing, a solenoid operated valve 33 is installed in the sample draw-off line 11. The secondary timing mechanism comprises a switch 24 adapted to be opened and closed by an eccentric 25 driven by a constant speed motor 26 through speed reducing gears 27.

As stated hereinabove the apparatus of Fig. 2 may be substituted for the apparatus shown below the dotted line X—X of Fig. 1, the points A, B and C being common to both views.

With the apparatus of Fig. 2 substituted for that shown below line X—X of Fig. 1 the operation is similar to that already described.

When the pen 4 engages one of the contacts 2 the switch 9 will close permitting current to flow to the lead connecting the solenoid 23 and the motor 26. The solenoid will open its valve and at the same time the eccentric 25 will turn to permit the switch 24 to close, thus permitting current to pass through this switch to the lead connecting the solenoid 23 and the motor 26 and this circuit will remain closed until the eccentric 25 has made a complete revolution, whereupon it will again open the switch 24. Thus, by proper selection of the speed of the motor 26 and the reduction gear 27 the solenoid 23 will be caused to maintain the valve in the sampling line 11 open until the desired amount of sample has been withdrawn.

Obviously many modifications and variations of the invention, as hereinbefore set forth, may be made without departing from the spirit and scope thereof, and therefore only such limitations should be imposed as are indicated in the appended claims.

I claim:

1. An automatic sampling device for use in obtaining samples of a fluid flowing through a pipe line at intervals the frequency of which vary in accordance with the flow rate through said pipe line comprising a sample draw-off line connected to said pipe line, a rotatable valve in said draw-off line, electrical actuating means for said valve, a device responsive to the flow through said pipe line, a source of electricity, an electrical circuit connected to said valve actuating means, a primary timing device actuated by said flow responsive device for intermittently connecting said source to said circuit, a secondary timing device for maintaining said circuit closed for predetermined intervals after it is first closed by said primary timing device, and means for actuating said secondary timing device comprising an eccentric connected to said valve to rotate therewith and a drive rod connecting said eccentric and said secondary timing device.

2. An automatic sampling device for use in obtaining samples of a fluid flowing through a pipe line at intervals the frequency of which vary in accordance with the flow rate through said pipe line comprising a sample draw-off line connected to said pipe line, a valve in said draw-off line, electrical actuating means for said valve, a rotating face meter responsive to the flow through pipe line, a source of electricity, an electrical circuit connected to said valve actuating means, a primary timing device for intermittently closing said circuit to connect said source to said valve actuating means, said primary timing device including a pen arm on said meter, a plurality of contacts on the rotating face of said meter, a tiltable mercury switch normally biased to its open position and connected in said circuit between said source and said valve actuating means, an electro-magnet adapted when energized to tilt said switch to its closed position, and means for energizing said magnet when said pen arm engages one of said contacts, and a secondary timing device for maintaining said circuit closed for predetermined intervals after it is first closed by said primary timing device.

3. An automatic sampling device for use in obtaining samples of a fluid flowing through a pipe line at intervals the frequency of which vary in accordance with the flow rate through said pipe line, comprising a sample draw-off line connected to said pipe line, a valve in said draw-off line, electrical actuating means for said valve, a rotating face meter responsive to the flow through said pipe line, a source of electricity, an electrical circuit connected to said valve actuating means, a primary timing device for intermittently closing said circuit to connect said source to said valve actuating means, said primary timing device including a pen arm on said meter, a plurality of contacts on the rotating face of said meter, a relay having an energizing winding and contact points, a second source of electricity, said pen arm, contacts, relay winding and second source being connected in a second circuit adapted to be closed when said arm engages one of said contacts, a tiltable mercury switch normally biased to its open position and connected in said circuit between said source and said valve actuating means, an electro-magnet adapted when energized to tilt said switch to its closed position, said electro-magnet, said relay contacts and said first electrical source being connected in a third circuit adapted to be closed when said relay winding is energized, and a secondary timing device for maintaining said circuit closed for predetermined intervals after it is first closed by said primary timing device.

4. An automatic sampling device for use in obtaining samples of a fluid flowing through a pipe line at intervals the frequency of which vary in accordance with the flow rate through said pipe line comprising a sample draw-off line connected to said pipe line, a rotatable valve in said draw-off line, electrical actuating means for said valve, a device responsive to the flow through said pipe line, a source of electricity, an electrical circuit connected to said valve actuating means, a primary switching device actuated by said flow responsive device for intermittently closing said circuit to connect said source to said valve actuating means, a secondary switching device for maintaining said circuit closed for predetermined intervals after it is first closed by said primary switching device, said secondary switching device including a tiltable mercury switch connected in parallel to said primary switching device, an arm on said switch and means for tilting said switch comprising an eccentric connected to said valve to rotate therewith and a drive rod connecting said eccentric and the arm on said switch.

5. An automatic sampling device for use in obtaining samples of a fluid flowing through a pipe line at intervals the frequency of which vary in accordance with the flow rate through said pipe line, comprising a draw-off line connected to said pipe line, a valve in said draw-off line, electrical actuating means for said valve, a rotating face meter responsive to the flow through said pipe line, a source of electricity, an electrical circuit connected to said valve actuating means, a primary switching device for intermittently closing said circuit to connect said source to said valve actuating means, said primary switching device including a pen arm on said meter, a plurality of contacts on the rotating face of said meter, a tiltable mercury switch normally biased to its open position and connected in said circuit between said source and said valve actuating means, an electro-magnet adapted when energized, to tilt said switch to its closed position, and means for energizing said magnet when said pen arm engages one of said contacts, and a secondary switching device for maintaining said circuit closed for predetermined intervals after it is first closed by said primary switching device, said secondary switching device including a second tiltable mercury switch connected in parallel to said first mentioned mercury switch, an arm on said second switch, and means for tilting said second switch comprising an eccentric connected to said valve to rotate therewith and a drive rod connecting said eccentric and the arm on said second switch.

GEORGE C. FAIRBAIRN.

REFERENCES CITED

The following references are of record in the file of this patent:

UNITED STATES PATENTS

| Number | Name | Date |
|---|---|---|
| 1,649,399 | Gard | Nov. 15, 1927 |
| 2,183,338 | Slough | Dec. 12, 1939 |
| 2,245,679 | Kelley | June 17, 1941 |
| 2,418,876 | Grace, Jr. | Apr. 15, 1947 |